United States Patent
Kim et al.

(10) Patent No.: US 9,601,736 B2
(45) Date of Patent: Mar. 21, 2017

(54) RECHARGEABLE BATTERY HAVING INSULATION LAYER

(71) Applicant: SAMSUNG SDI CO., LTD., Yongin-si, Gyeonggi-do (KR)

(72) Inventors: Dae-Kyu Kim, Yongin-si (KR); Takao Abe, Yongin-si (KR)

(73) Assignee: SAMSUNG SDI CO., LTD., Yongin-si, Gyeonggi-Do (KR)

( * ) Notice: Subject to any disclaimer, the term of this patent is extended or adjusted under 35 U.S.C. 154(b) by 0 days.

(21) Appl. No.: 14/735,351

(22) Filed: Jun. 10, 2015

(65) Prior Publication Data
US 2016/0028058 A1    Jan. 28, 2016

(30) Foreign Application Priority Data
Jul. 25, 2014   (KR) .................... 10-2014-0095102

(51) Int. Cl.
  *H01M 2/12*   (2006.01)
  *H01M 2/34*   (2006.01)
(52) U.S. Cl.
  CPC ....... *H01M 2/1264* (2013.01); *H01M 2/1241* (2013.01); *H01M 2/345* (2013.01); *H01M 2200/106* (2013.01); *H01M 2200/20* (2013.01)
(58) Field of Classification Search
  CPC .... H01M 2/1264; H01M 2/02; H01M 2/0202; H01M 2/0237; H01M 2/08; H01M 2220/20; H01M 2220/30; H01M 2/14241; H01M 2/345; H01M 2200/106; H01M 2200/20
  See application file for complete search history.

(56) References Cited

U.S. PATENT DOCUMENTS

| 5,427,875 A * | 6/1995 | Yamamoto | H01M 2/34 429/223 |
| 6,723,465 B2 * | 4/2004 | Segawa | H01M 2/0413 429/174 |
| 6,926,992 B2 * | 8/2005 | Isozaki | H01M 2/0486 429/175 |
| 2011/0151293 A1 * | 6/2011 | Kim | H01M 2/0413 429/62 |

FOREIGN PATENT DOCUMENTS

| JP | 2000-197260 A | 7/2000 | |
| KR | 1999-0041931 U | 12/1999 | |
| KR | EP 2175507 A1 * | 4/2010 | ......... H01M 2/1241 |

* cited by examiner

*Primary Examiner* — Gregg Cantelmo
(74) *Attorney, Agent, or Firm* — Lee & Morse P.C.

(57) ABSTRACT

A rechargeable battery includes an electrode assembly including a positive electrode and a negative electrode, a case receiving the electrode assembly, a cap plate coupled to the case, a vent plate under the cap plate, the vent plate including a notch, a middle plate under the vent plate, and a laminating insulating layer between the vent plate and the middle plate, the laminating insulating layer being laminated to the vent plate or the middle plate.

12 Claims, 4 Drawing Sheets

RECHARGEABLE BATTERY HAVING INSULATION LAYER

CROSS-REFERENCE TO RELATED APPLICATION

Korean Patent Application No. 10-2014-0095102, filed on Jul. 25, 2014, in the Korean Intellectual Property Office, and entitled: "Rechargeable Battery Having Insulation Layer," is incorporated by reference herein in its entirety.

BACKGROUND

1. Field

Embodiments relate to a rechargeable battery. More particularly, embodiments relate to a rechargeable battery having an insulation layer.

2. Description of the Related Art

A rechargeable battery is a battery that can be repeatedly charged and discharged, unlike a primary battery. A small capacity rechargeable battery may be used in a small portable electronic device, e.g., a mobile phone, a laptop computer, or a camcorder, and a large capacity rechargeable battery may be used as a power supply, e.g., for a motor driving a hybrid vehicle and an electric vehicle.

The rechargeable battery may be used as a single cell for operating a small-sized electronic device, or may be used as a module which electrically connects a plurality of cells, e.g., for driving a motor. The rechargeable battery has a vent plate that is opened by an increase of pressure.

SUMMARY

A rechargeable battery according to embodiments includes an electrode assembly including a positive electrode and a negative electrode; a case receiving the electrode assembly; a cap plate coupled to the case; a vent plate disposed under the cap plate and formed with a notch; a middle plate disposed under the vent plate; and a laminating insulating layer disposed between the vent plate and the middle plate and adhered to the vent plate or the middle plate by laminating.

The laminating insulating layer may be adhered to an upper surface of the middle plate, and the laminating insulating layer may be formed of a film.

The thermally fusing insulating layer adhered to the laminating insulating layer by thermal fusing may be positioned between the laminating insulating layer and the vent plate, and the laminating insulating layer may be made of a polypropylene-based resin, while the thermally fusing insulating layer may be formed of a polybutylene-based resin.

The vent plate may have a downwardly depressed groove portion, a connection protrusion protruded from a center of the groove portion, and a notch formed around the connection protrusion, and a step portion that is downwardly concave may be formed at a portion where the groove portion and the upper surface of the vent plate meet.

A bottom thickness of the step portion may be thinner than its surroundings, the groove portion may have a bottom and an outer wall protruded upwardly from the bottom, and the outer wall has a thinner thickness than the bottom.

A penetration hole inserted with the connection protrusion may be formed at the middle plate and a vent hole may be formed outside the penetration hole for pressure to be transmitted to the vent plate, a lead tab electrically connected to the positive electrode may be fixed and installed to the middle plate, and a sub-plate adhered to the middle plate and the connection protrusion by welding may be installed under the middle plate.

Also, a recess portion having an external circumference of the groove portion insert therein is formed at the middle plate, the penetration hole and the vent hole may be formed at the bottom of the recess portion, and the laminating insulating layer may be adhered to the lower surface of the vent plate.

BRIEF DESCRIPTION OF THE DRAWINGS

Features will become apparent to those of ordinary skill in the art by describing in detail exemplary embodiments with reference to the attached drawings, in which.

DETAILED DESCRIPTION

Figure 1:
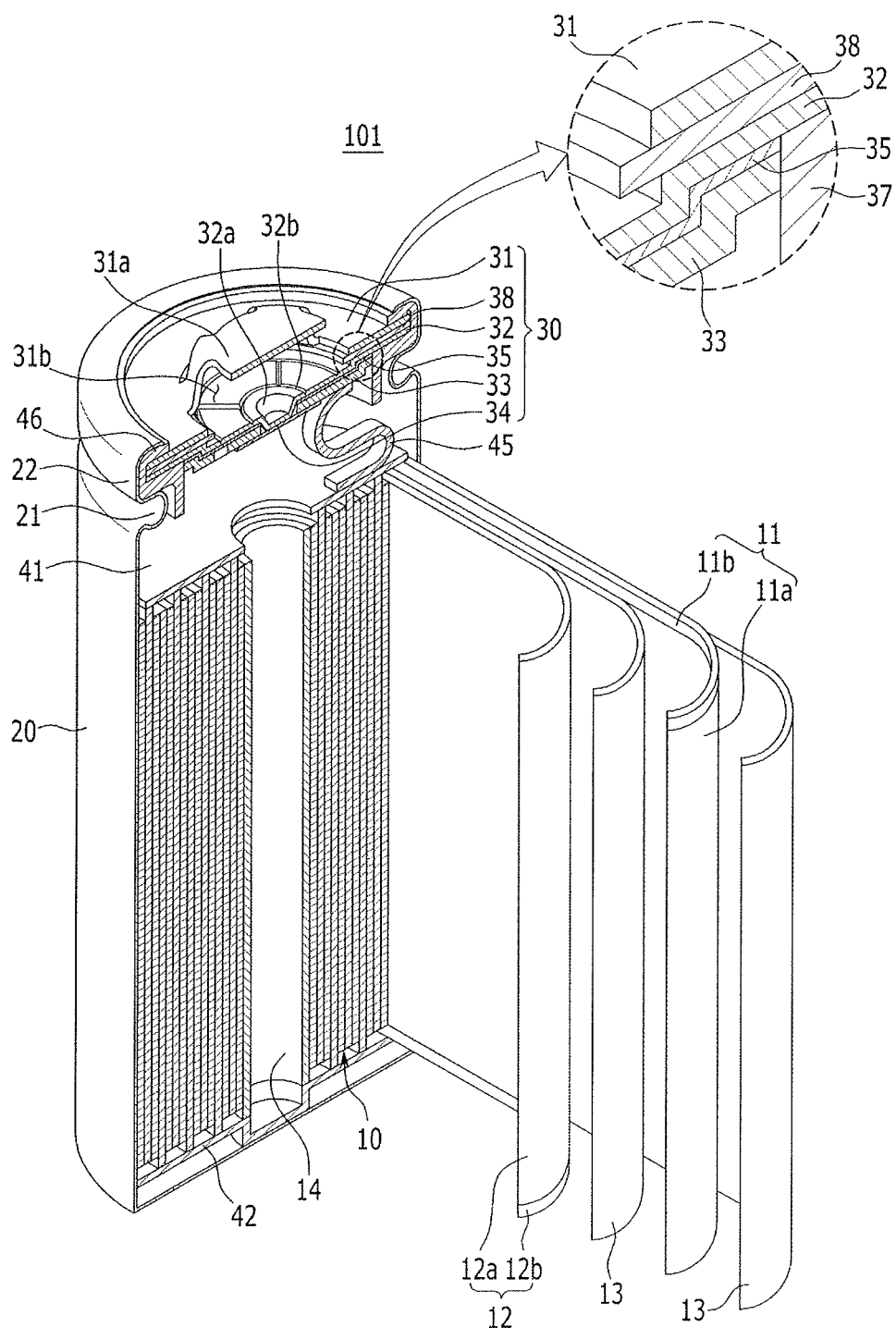
FIG. 1 illustrates a cut-away perspective view of a rechargeable battery according to a first exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

FIG. 1 is a cut-away perspective view of a rechargeable battery according to a first exemplary embodiment.

Referring to FIG. 1, a rechargeable battery 101 according to the first exemplary embodiment may include an electrode assembly 10 generating a current, a case 20 receiving the electrode assembly 10, and a cap assembly 30 coupled to the case 20 to be electrically connected to the electrode assembly 10.

The electrode assembly 10 may include a positive electrode 11, a separator 13, and a negative electrode 12 that are sequentially disposed. The electrode assembly 10 may be formed by spiral-winding the positive electrode 11 and the negative electrode 12, with the separator 13 as an insulator disposed therebetween. As an example, the electrode assembly 10 may be formed in a cylindrical shape. A core pin 14 may be disposed at the center of the cylindrical electrode assembly 10. The core pin 14 may be formed with a cylindrical shape, and may support the electrode assembly 10 to maintain the cylindrical shape of the electrode assembly 10.

The positive electrode 11 and the negative electrode 12 form a current collector made of a metal foil of a thin plate, and include respective coated regions 11a and 12a coated with an active material, and respective uncoated regions 11b and 12b at which the active material is not coated. A positive current collecting plate 41 is connected to the uncoated region 11b of the positive electrode 11, and the positive current collecting plate 41 is disposed at an upper end of the electrode assembly 10. A negative current collecting plate 42 is connected to the uncoated region 12b of the negative electrode 12, and the negative current collecting plate 42 is disposed at a lower end of the electrode assembly 10 and is adhered to the bottom of the case 20 by welding.

In the exemplary embodiment, the positive current collecting plate 41 is installed at the upper portion of the electrode assembly 10 and the negative current collecting plate 42 is installed at the lower portion of the electrode assembly 10, but embodiments are not limited thereto, e.g., the positive current collecting plate may be installed at the lower portion of the electrode assembly and the negative current collecting plate may be installed at the upper portion of the electrode assembly.

The case 20 may be formed in a cylindrical shape or a prismatic shape with one side opened so as to insert the electrode assembly 10 therein. The case 20 may be connected to the negative electrode current collecting plate 42 to function as a negative terminal in the rechargeable battery 101, and is made of a conductive metal, e.g., aluminum, an aluminum alloy, or nickel-plated steel.

After being fitted into the case 20, the cap assembly 30 is fixed to the case 20 by a clamping process. A beading portion 21 and a clamping portion 22 may be formed in the case 20.

Figure 2:
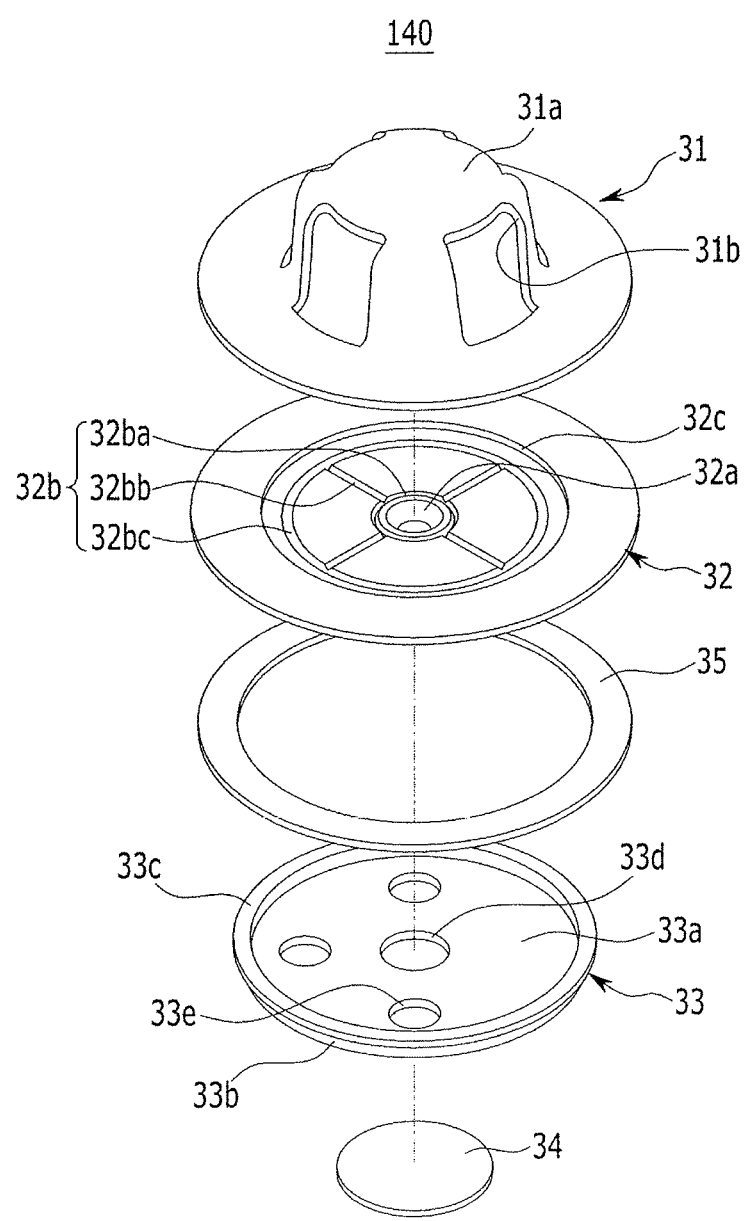
FIG. 2 illustrates an exploded perspective view of a cap assembly according to a first exemplary embodiment.
Figure 3:
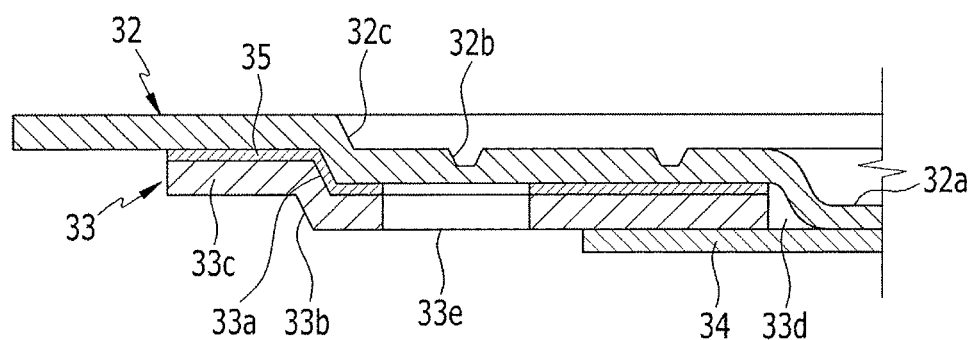
FIG. 3 illustrates a cross-sectional view of a portion of a cap assembly according to a first exemplary embodiment.

FIG. 2 is an exploded perspective view of the cap assembly 30, and FIG. 3 is a partial cross-sectional view of the cap assembly 30.

Referring to FIG. 2 and FIG. 3, in order to close and seal the case 20, in which the electrode assembly 10 and an electrolyte solution are placed, the cap assembly 30 according to the first exemplary embodiment is combined with an opened side of the case 20. The cap assembly 30 may include a cap plate 31, a vent plate 32, a middle plate 33, a sub-plate 34, and a positive temperature coefficient (PTC) element 38 (FIG. 1).

As illustrated in FIG. 2, the cap plate 31 is formed in a plate shape with an upwardly protruding outer terminal 31a and an exhaust port 31b. Thus, the cap plate 31 is electrically connected to the positive current collecting plate 41 to function as a positive terminal in the rechargeable battery 101.

As illustrated in FIG. 1, the PTC element 38 is disposed between the cap plate 31 and the vent plate 32. The PTC element 38 is formed with a circular ring shape and is positioned between the cap plate 31 and the vent plate 32. The PTC element 38, of which resistance increases as the temperature increases, controls current flow between the cap plate 31 and the vent plate 32. Under a condition exceeding a predetermined temperature, the PTC 38 has electrical resistance that increases up to infinity, thereby cutting off a charging or discharging current.

As illustrated in FIGS. 1-2, the vent plate 32 is disposed under the cap plate 31, and serves to electrically disconnect the electrode assembly 10 from the cap plate 31 under a predetermined pressure condition. Further, the vent plate 32 is ruptured under a predetermined pressure condition so as to discharge internal gas of the rechargeable battery 101.

Referring to FIG. 2, the vent plate 32 is provided with a groove portion 32c protruding downward, a connection protrusion 32a downwardly protruding from a center of the groove portion 32c toward the sub-plate 34, and a notch 32b formed around the connection protrusion 32a. The notch 32b may be formed in various shapes such that it is ruptured as internal pressure of the rechargeable battery 101 is increased. The notch 32b according to the present exemplary embodiment includes an inner circle notch 32ba formed around the connection protrusion 32a, a radial notch 32bb radially extending from the inner circle notch 32ba, and an outer circle notch 32bc connected to outmost ends of the radial notch 32bb.

The vent plate 32 and the sub-plate 34 form a current interrupt device (CID) interrupting the current when the inner pressure of the rechargeable battery is increased. The connection of the current interrupt device (CID) is formed by the connection protrusion 32a and a welding portion of the sub-plate 34. The connection protrusion 32a and the sub-plate 34 are divided, e.g., separated, while the connection protrusion 32a is moved upwardly when the current interrupt device (CID) is operated, and thereby the electrode assembly 10 and the cap plate 31 are electrically disconnected.

Further, once the connection protrusion 32a is moved upwardly, if the internal pressure of the rechargeable battery 101 is further increased, the notch 32b is ruptured to discharge the internal gas of the rechargeable battery 101 through the exhaust port 31b. The sub-plate 34 is formed in a circular plate shape, and faces the vent plate 32 such that it is electrically connected to the connection protrusion 32a. The sub-plate 34 is connected to the middle plate 33 by welding to be electrically connected to the electrode assembly 10 via the middle plate 33. The middle plate 33 is only electrically connected to the vent plate 32 through the sub-plate 34, and the sub-plate 34 must not directly contact the vent plate 32 such that the current interrupt device may be operated.

The middle plate 33 is disposed between the vent plate 32 and the sub-plate 34. A penetration hole 33d is formed at the center of the middle plate 33 to accommodate, e.g., insert, the connection protrusion 32a of the vent plate 32 therethrough. A plurality of vent holes 33e are formed through the middle plate 33 outside of, e.g., adjacent to, the penetration hole 33d, such that the internal pressure of the rechargeable battery 101 may be transmitted to the vent plate 32 through the vent holes 33e.

Also, the middle plate 33 is formed with a recess portion 33a for inserting an external circumference of the groove portion 32c of the vent plate 32, and the penetration hole 33d and the vent hole 33e are formed at a bottom of the recess portion 33a. The recess portion 33a has a supporting wall 33b protruded upwardly, and a flange 33c at the top of the supporting wall 33b. In other words, as illustrated in FIG. 2, the recess portion 33a of the middle plate 33 may be defined by a flat bottom with the supporting wall 33b extending above the flat bottom and surrounding the perimeter thereof, while the flange 33c may radially extend away from a top of the supporting wall 33b. The flange 33c and the flat bottom may be at opposite ends of the supporting wall 33b, and the penetration hole 33d and the vent hole 33e may be formed through the flat bottom.

As illustrated in FIG. 3 and the enlarged portion of FIG. 1, the groove portion 32c of the vent plate 32 fits, e.g., is inserted, into the recess portion 33a of the middle plate 33, so the connection protrusion 32a of the vent plate 32 is inserted through the penetration hole 33d of the middle plate 33 to electrically connect to the sub-plate 34. As described previously, the middle plate 33 is only electrically connected to the vent plate 32 through the sub-plate 34, so when pressure in the electrode assembly 10 increases, electrical disconnection between the connection protrusion 32a of the vent plate 32 and the sub-plate 34, e.g., by movement of the connection protrusion 32a upwardly toward the outer terminal 31a (FIG. 2), electrically disconnects the vent plate 32 from the middle plate 33.

A lead member 45 is fixed to the middle plate 33, e.g., by welding, to be electrically connected to the positive electrode current collecting plate 41. The lead member 45 is respectively connected to the positive electrode current collecting plate 41 and the middle plate 33, e.g., by welding, to electrically connect the positive electrode current collecting plate 41 and the middle plate 33.

Accordingly, the middle plate 33 is electrically connected to the vent plate 32 at one side through the sub-plate 34 and the connection protrusion 32a, and is connected to the positive electrode current collecting plate 41 at the other side through the lead member 45. As a result, the positive electrode current collecting plate 41 is electrically connected to the cap plate 31 through the lead member 45, the middle plate 33, the sub-plate 34, and the vent plate 32.

As illustrated in FIG. 3 and the enlarged portion of FIG. 1, a laminating insulating layer 35 is installed between the middle plate 33 and the vent plate 32 to insulate the middle plate 33 from the vent plate 32. For example, the laminating insulating layer 35 may have a ring shape that overlaps edges of the middle plate 33, e.g., overlaps the flange 33c and the supporting wall 33b of the middle plate 33, and exposes the penetration hole 33d. The laminating insulating layer 35 is attached to an upper surface of the middle plate 33, e.g., by laminating, and is formed to have a film shape, e.g., a thickness of the laminating insulating layer 35 may be smaller than a thickness of each of the vent plate 32 and the middle plate 33. For example, the laminating insulating layer 35 may be adhered to the middle plate 33 by thermal fusing or may be adhered to the middle plate 33 by an adhesive. For example, the laminating insulating layer 35 may be made of a polypropylene-based resin. While the laminating insulating layer 35 is adhered to the upper surface of the middle plate 33, the middle plate 33 may be processed by molding, so the middle plate 33 and the laminating insulating layer 35 are processed together to reduce manufacturing costs and simplify the process.

Figure 4:
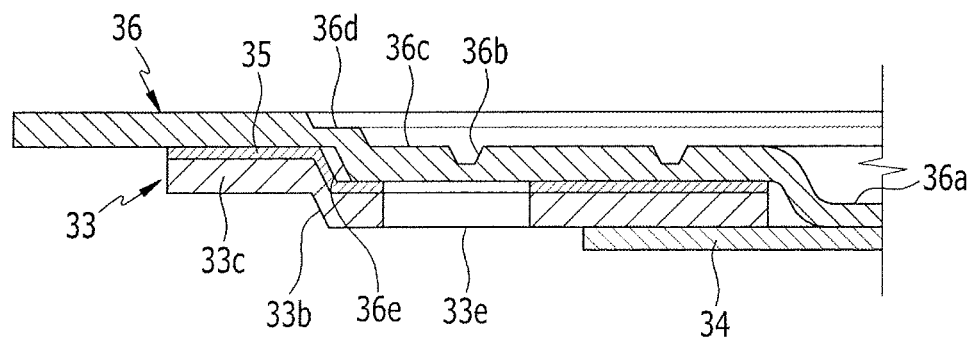
FIG. 4 illustrates a cross-sectional view of a portion of a cap assembly according to a second exemplary embodiment.

FIG. 4 is a partial cross-sectional view of a cap assembly according to a second exemplary embodiment. The rechargeable battery according the second exemplary embodiment has the same structure as the rechargeable battery according to the first exemplary embodiment except for the structure of the vent plate, and therefore, overlapping description of the same structures is omitted.

Referring to FIG. 4, a vent plate 36 is disposed under the cap plate 31, and serves to electrically disconnect the electrode assembly 10 from the cap plate 31 under a predetermined pressure condition. Also, the vent plate 36 is ruptured under a predetermined pressure condition so as to discharge internal gas of the rechargeable battery 101.

To this end, the vent plate 36 is provided with a groove portion 36c protruding downwards, a connection protrusion 36a downwardly protruding from a center of the groove portion 36c toward the sub-plate 34, and a notch 36b formed around the connection protrusion 36a. The notch 36b may be formed in various shapes such that it is ruptured as internal pressure of the rechargeable battery 101 is increased.

In addition, a concave step portion 36d is formed at a portion where the groove portion 36c and the upper surface of the vent plate 36 meet each other. The step portion 36d is formed along the top end of the groove portion 36c and has a cross-section of an approximate ring shape. Also, the groove portion 36c has a bottom and an outer wall 36e protruded from the bottom, and the outer wall 36e has a thinner thickness than the bottom. For example, as illustrated in FIG. 4, the outer wall 36e may be spaced apart from the laminating insulating layer 35 to define an empty space therebetween, so an overall thickness of the outer wall 36e may be smaller than the thickness of the bottom, e.g., may equal half of the thickness of the bottom. Further, as illustrated in FIG. 4, the upper surface of the step portion 36d may be lower than an uppermost surface of the vent plate, so a thickness of the step portion 36d may be smaller than a thickness of an edge of the vent plate 36.

In the present exemplary embodiment, if the outer wall 36e of the groove portion 36c and the bottom thickness of the step portion 36d are thin, the notch is easily broken, and the cut pieces may be easily deformed. Accordingly, the exhaustion speed of gas from the rechargeable battery may be increased.

Figure 5:
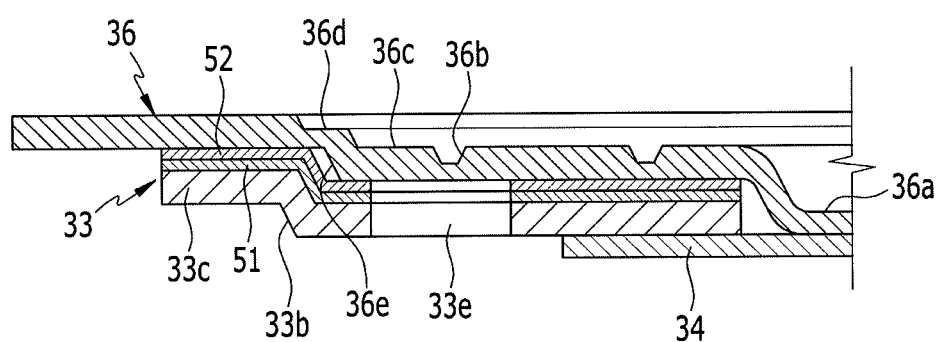
FIG. 5 illustrates a cross-sectional view of a portion of a cap assembly according to a third exemplary embodiment.

FIG. 5 is a partial cross-sectional view of a cap assembly according to a third exemplary embodiment. The rechargeable battery according the third exemplary embodiment has the same structure as the rechargeable battery according to the second exemplary embodiment except for an additional insulating layer on the middle plate, and therefore, overlapping descriptions of same structures are omitted.

Referring to FIG. 5, the middle plate 33 is disposed between the vent plate 36 and the sub-plate 34. The middle plate 33 is formed with the recess portion 33a to insert an external circumference of the groove portion 36c of the vent plate 36 therein, and such that the penetration hole 33d and the vent hole 33e are formed at the bottom of the recess portion 33a. The recess portion 33a has the supporting wall 33b protruding upwardly, and the flange 33c extending at the top of the supporting wall 33b.

In addition, a laminating insulating layer 51 insulating the middle plate 33 from the vent plate 36 is installed between the middle plate 33 and the vent plate 36. The laminating insulating layer 51 is adhered to the upper surface of the middle plate 33, e.g., by laminating, and is formed with a film shape. Also, the laminating insulating layer 51 may be adhered to the middle plate 33 by thermal fusing or may be adhered to the middle plate 33 by an adhesive.

Further, a thermally fusing insulating layer 52 adhered to the laminating insulating layer 51 by thermal fusing is formed on the laminating insulating layer 51. The laminating insulating layer 51 may be formed of a polypropylene-based film, and the thermally fusing insulating layer 52 may be formed of a polybutylene-based resin. For example, the thermally fusing insulating layer 52 may be formed of polybutylene terephthalate (PBT). In addition, the bottom surface of the thermally fusing insulating layer 52 may be adhered to the laminating insulating layer 51, and the upper surface of the thermally fusing insulating layer 52 may be adhered to the vent plate 36.

In the present exemplary embodiment, as the laminating insulating layer 51 and the thermally fusing insulating layer 52 are formed, e.g., sequentially stacked, on the middle plate 33, the middle plate 33 and the vent plate 36 may be better insulated from each other.

Figure 6:
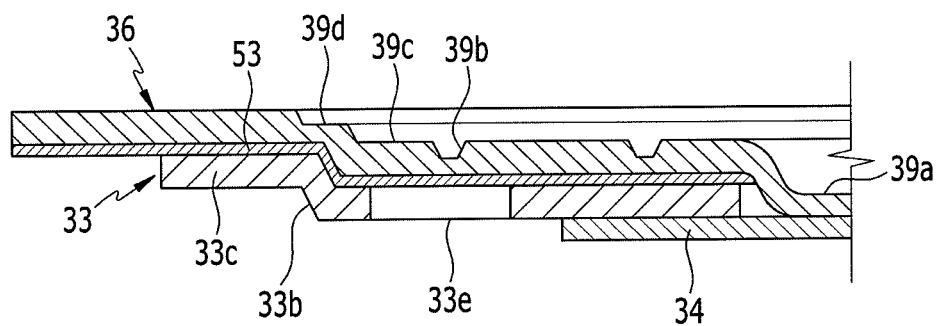
FIG. 6 illustrates a cross-sectional view of a portion of a cap assembly according to a fourth exemplary embodiment.

FIG. 6 is a partial cross-sectional view of a cap assembly of a fourth exemplary embodiment. The rechargeable battery according the fourth exemplary embodiment has the same structure as the rechargeable battery according to the first exemplary embodiment except for the structure of the vent plate and the laminating insulating layer, and therefore, overlapping descriptions of same structures are omitted.

Referring to FIG. 6, a vent plate 39 is disposed under the cap plate 31, and serves to electrically disconnect the electrode assembly 10 from the cap plate 31 under a predetermined pressure condition. Further, the vent plate 39 is ruptured under a predetermined pressure condition so as to discharge internal gas from the rechargeable battery 101.

To this end, the vent plate 39 is provided with a groove portion 39*c* protruding downwards, a connection protrusion 39*a* downwardly protruding from a center of the groove portion 39*c* toward the sub-plate 34, and a notch 39*b* formed around the connection protrusion 39*a*. The notch 39*b* may be formed in various shapes such that it is ruptured as internal pressure of the rechargeable battery 101 is increased. In addition, a concave step portion 39*d* is formed at the portion where the groove portion 39*c* and the upper surface of the vent plate 36 meet each other. The step portion 39*d* is continuously formed according to the top end of the groove portion 39*c*, and has a cross-section of an approximate ring shape.

Further, a laminating insulating layer 53 insulating the middle plate 33 from the vent plate 39 is formed between the middle plate 33 and the vent plate 39. The laminating insulating layer 53 is adhered to the bottom surface of the vent plate 39 and is formed of the film shape. The laminating insulating layer 53 may be adhered to the vent plate 39 by thermal fusing and may be adhered to the vent plate 39 by an adhesive.

By way of summation and review, according to exemplary embodiments, an insulating layer is laminated between the vent plate and the middle plate of a cap assembly in a rechargeable battery. As such, a stable insulating characteristic may be obtained while decreasing a total height and volume of the rechargeable battery. In contrast, a conventional insulating member increases the manufacturing costs of the rechargeable battery as well as the total height thereof.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A rechargeable battery, comprising:
an electrode assembly including a positive electrode and a negative electrode;
a case receiving the electrode assembly;
a cap plate coupled to the case;
a vent plate under the cap plate, the vent plate including a notch;
a middle plate under the vent plate;
a laminating insulating layer between the vent plate and the middle plate, the laminating insulating layer being laminated to the vent plate or the middle plate, and the laminating insulating layer having a smaller thickness than each of the vent plate and the middle plate; and
a thermally fusing insulating layer on the laminating insulating layer, the thermally fusing insulating layer being between the laminating insulating layer and the vent plate.

2. The rechargeable battery as claimed in claim 1, wherein the laminating insulating layer is adhered to an upper surface of the middle plate.

3. The rechargeable battery as claimed in claim 1, wherein the laminating insulating layer is a film.

4. The rechargeable battery as claimed in claim 1, wherein the laminating insulating layer includes a polypropylene-based resin, and the thermally fusing insulating layer includes a polybutylene-based resin.

5. The rechargeable battery as claimed in claim 1, wherein the vent plate has a downwardly depressed groove portion, a connection protrusion protruding from a center of the groove portion, and a notch around the connection protrusion.

6. The rechargeable battery as claimed in claim 5, wherein the vent plate further comprises a downwardly concave step portion at a connection portion between the groove portion and an upper surface of the vent plate.

7. The rechargeable battery as claimed in claim 6, wherein a thickness of the step portion is smaller than a thickness of an edge of the vent plate.

8. The rechargeable battery as claimed in claim 6, wherein the groove portion has a bottom and an outer wall protruding upwardly from the bottom, the outer wall having a smaller thickness than the bottom.

9. The rechargeable battery as claimed in claim 6, wherein the middle plate includes a penetration hole and at least one vent hole, a connection protrusion of the vent plate being inserted into the penetration hole of the middle plate, and the vent hole transmits pressure to from the electrode assembly toward the vent plate.

10. The rechargeable battery as claimed in claim 1, wherein the laminating insulating layer is adhered to a lower surface of the vent plate.

11. A rechargeable battery, comprising:
an electrode assembly including a positive electrode and a negative electrode;
a case receiving the electrode assembly;
a cap plate coupled to the case;
a vent plate under the cap plate, the vent plate including a notch;
a middle plate under the vent plate;
a laminating insulating layer between the vent plate and the middle plate, the laminating insulating layer being laminated to the vent plate or the middle plate; and
a thermally fusing insulating layer on the laminating insulating layer, the thermally fusing insulating layer being between the laminating insulating layer and the vent plate.

12. A rechargeable battery, comprising:
an electrode assembly including a positive electrode and a negative electrode;
a case receiving the electrode assembly;
a cap plate coupled to the case;
a vent plate under the cap plate, the vent plate including a notch;
a middle plate under the vent plate; and
a laminating insulating layer between the vent plate and the middle plate, the laminating insulating layer being laminated to the vent plate or the middle plate, wherein the vent plate has a downwardly depressed groove portion, a connection protrusion protruding from a center of the groove portion, a notch around the connection protrusion, and a downwardly concave step portion at a connection portion between the groove portion and an upper surface of the vent plate.

* * * * *